United States Patent
Rowe et al.

(10) Patent No.: US 10,343,246 B1
(45) Date of Patent: Jul. 9, 2019

(54) AUTOMATED MACHINING APPARATUS HAVING A WORKPIECE HOLDER WITH A ROTATABLE TURRET THAT HOLDS MULTIPLE WORKPIECES

(71) Applicants: Gerald L Rowe, Lake Mary, FL (US); Jose Ramos, Orlando, FL (US)

(72) Inventors: Gerald L Rowe, Lake Mary, FL (US); Jose Ramos, Orlando, FL (US)

(*) Notice: Subject to any disclaimer, the term of this patent is extended or adjusted under 35 U.S.C. 154(b) by 330 days.

(21) Appl. No.: 15/243,549

(22) Filed: Aug. 22, 2016

Related U.S. Application Data

(60) Provisional application No. 62/208,006, filed on Aug. 21, 2015.

(51) Int. Cl.
| | | |
|---|---|---|
| *B23Q 39/00* | (2006.01) | |
| *B23Q 39/02* | (2006.01) | |
| *B23Q 41/04* | (2006.01) | |
| *B23Q 7/02* | (2006.01) | |

(52) U.S. Cl.
CPC ............. *B23Q 39/027* (2013.01); *B23Q 7/02* (2013.01); *B23Q 41/04* (2013.01); *B23Q 2039/008* (2013.01); *B23Q 2707/003* (2013.01)

(58) Field of Classification Search
CPC ........... Y10T 29/5125; Y10T 29/49998; Y10T 29/5127; Y10T 29/5128; Y10T 29/5129; Y10T 82/2593; Y10T 82/2514; B23Q 3/1472; B23Q 3/061; B23Q 39/046; B23Q 1/763; B23Q 7/02; B23Q 16/061; B23B 3/16; B23B 29/24
See application file for complete search history.

(56) References Cited

U.S. PATENT DOCUMENTS

| | | | |
|---|---|---|---|
| 3,170,348 A | | 2/1965 | McFerren |
| 3,710,466 A | | 1/1973 | Williamson et al. |
| 3,974,553 A | * | 8/1976 | Reiger, Jr. .............. B23P 23/00 29/38 C |
| 4,057,893 A | | 11/1977 | Smith et al. |
| 4,404,727 A | * | 9/1983 | Zankl .................. B23Q 3/15513 483/14 |
| 4,597,144 A | * | 7/1986 | Frank ................... B23Q 1/5481 29/36 |
| 4,635,340 A | * | 1/1987 | Link ....................... B23B 3/168 29/27 A |
| 5,313,861 A | | 5/1994 | Ikeda |
| 5,452,502 A | * | 9/1995 | Walter ................. B23Q 1/5437 29/38 A |
| 6,298,531 B1 | * | 10/2001 | Baumbusch ........... B23Q 1/015 29/36 |

(Continued)

*Primary Examiner* — Will Fridie, Jr.
(74) *Attorney, Agent, or Firm* — Christopher M. Ramsey; GrayRobinson, P.A.

(57) ABSTRACT

An automated machining apparatus has a lathe, a mill, and a workpiece holder that holds a plurality of workpieces to be machined. The workpiece holder includes a rotatable turret that has a plurality of workpiece mounting positions for mounting the plurality of workpieces to be machined to the rotatable turret. A controller in operable communication with the workpiece holder is operable to rotate the rotatable turret sequentially through different workpiece mounting positions according to program instructions that define machining operations to be performed on the plurality of workpieces.

12 Claims, 5 Drawing Sheets

(56) References Cited

U.S. PATENT DOCUMENTS

| | | | | |
|---|---|---|---|---|
| 7,000,511 | B2 * | 2/2006 | Zuccalli | B23Q 1/0027 82/123 |
| 7,204,004 | B2 * | 4/2007 | Hashimoto | B23Q 39/028 29/27 C |
| 7,506,423 | B2 * | 3/2009 | Iwabuchi | B23B 3/065 29/27 C |
| 7,748,302 | B2 * | 7/2010 | Kato | B23Q 5/341 82/117 |
| 7,988,531 | B2 * | 8/2011 | Braun | B23Q 3/15706 451/10 |
| 8,505,421 | B2 | 8/2013 | Roden | |
| 8,776,357 | B2 | 7/2014 | Hyatt et al. | |
| 8,881,627 | B2 | 11/2014 | Masuda | |
| 9,751,171 | B2 * | 9/2017 | Mandler | B24B 13/0037 |
| 2007/0010171 | A1 * | 1/2007 | Klotz | B24B 35/00 451/11 |
| 2013/0221589 | A1 | 8/2013 | Mandler | |

* cited by examiner

AUTOMATED MACHINING APPARATUS HAVING A WORKPIECE HOLDER WITH A ROTATABLE TURRET THAT HOLDS MULTIPLE WORKPIECES

CROSS-REFERENCE TO RELATED APPLICATION

This claims priority to U.S. provisional Application No. 62/208,006, filed Aug. 21, 2015, which is incorporated by reference in its entirety.

FIELD

This relates to the field of machining and, more particularly, to automated machining devices.

BACKGROUND

Modern multiple-axis lathe/milling machines are useful for machining complex parts in less time compared to conventional single purpose mills and lathes. The combination lathe/milling machines can perform both lathe and milling operations on a workpiece without removing the workpiece from the machine. The machine may even be able to switch between different lathe and mill tools for different types of operations. Some complex parts can be completed by the machine without a machinist ever needing to manually change a tool or reposition the workpiece.

Some CNC machines have a tool turret that holds multiple cutting tools for performing different cutting operations. During a cutting operation, the tool turret holds the cutting tool against a moving workpiece being machined. Such a tool turret is very useful when different cutting tools are needed to machine the workpiece. FIG. 3 of U.S. Pat. No. 8,246,026 shows an example of a rotatable tool turret on a multi-axis CNC machine.

SUMMARY

The present inventors encountered a need to automate the machining of multiple workpieces using a multi-axis CNC machine equipped with a rotatable tool turret. The inventors solved this problem by replacing the rotatable tool turret with a workpiece holder having a rotatable turret that holds a plurality of workpieces to be machined. Such a workpiece holder allows for automated machining operations to be performed on multiple workpieces. It can hold a workpiece being machined in position then, once the machining operations on that workpiece are finished, it can rotate another workpiece into position to be machined. This can be repeated until all of the workpieces have been machined. Certain example embodiments in which such a workpiece holder may be included are now described.

In a first example, an automated machining apparatus includes a lathe that performs lathe machining operations, a mill that performs mill machining operations, and a workpiece holder that holds a plurality of workpieces to be machined. The workpiece holder includes a rotatable turret having a plurality of workpiece mounting positions thereon for mounting the plurality of workpieces to be machined to the rotatable turret. A controller in operable communication with the workpiece holder is operable to rotate the rotatable turret sequentially through different workpiece mounting positions according to program instructions defining machining operations to be performed on the plurality of workpieces.

In a second example, method of making machined parts includes controlling a lathe, a mill, and rotatable turret using a computerized controller storing program instructions for performing lathe and mill machining operations on a plurality of workpieces circumferentially mounted on the rotatable turret. The turret is rotated so as to position a first workpiece of the plurality of workpieces in a cutting position. A first machining operation is performed on the first workpiece according to the stored program instructions. The turret is then rotated so as to position a second workpiece of the plurality of workpieces in the cutting position and a second machining operation is performed on the second workpiece according to the stored program instructions.

In a third example, a multi-axis automated machining apparatus includes a first lathe that performs lathe machining operations and has a first lathe spindle that rotates about a first axis when performing lathe machining operations. The apparatus also includes a second lathe that performs lathe machining operations and has a second lathe spindle that rotates about a second axis when performing lathe machining operations. The second axis is parallel to or coaxial with the first axis. The apparatus also has a mill having a mill spindle that rotates about a third axis that is substantially perpendicular to the first axis when performing mill machining operations.

A workpiece holder of the multi-axis apparatus holds a plurality of workpieces to be machined. The workpiece holder includes a rotatable turret having a plurality of workpiece mounting positions thereon for mounting the plurality of workpieces to be machined to the rotatable turret. The rotatable turret is rotatable around a fourth axis that is substantially parallel to the first axis.

A controller is in operable communication with the first lathe, second lathe, mill, and workpiece holder. The controller is operable to rotate the turret sequentially through different workpiece mounting positions according to program instructions defining machining operations to be performed on the plurality of workpieces.

One or more of the following features may be included in these example embodiments.

The controller of the apparatus of the first and/or second example may execute program instructions that cause the method of the third example to be performed.

The lathe may include a lathe spindle that rotates around a first axis when performing lathe machining operations.

The rotatable turret may rotate around a second axis that is substantially parallel to the first axis.

The workpiece holder may be linearly translatable in a direction substantially parallel to the first axis.

The plurality of workpiece mounting positions may be arcuately spaced apart along a circumference of the rotatable turret, the circumference circumscribing a rotational axis of the rotatable turret.

The controller may be operable to rotate the rotatable turret sequentially through different workpiece mounting positions in such a way that once the defined machining operations are complete on a first workpiece, the controller rotates the rotatable turret so as to position a second workpiece in position for the defined machining operations to be performed on the second workpiece.

BRIEF DESCRIPTION OF THE DRAWINGS

FIG. 4 is a perspective view of a workpiece undergoing a milling operation; and.

DETAILED DESCRIPTION OF EXAMPLE EMBODIMENTS

Figure 1:
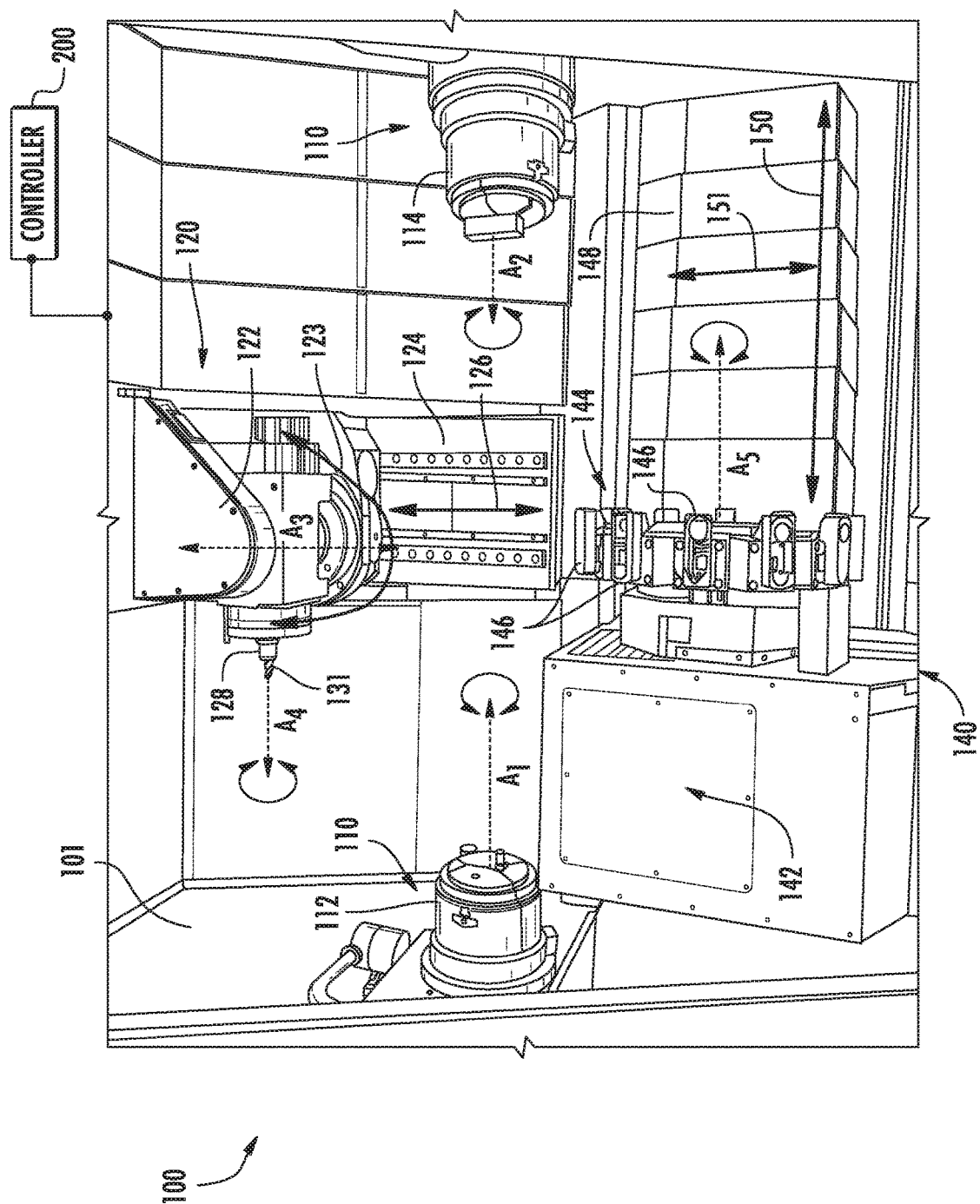
FIG. 1 is a side view of a machining apparatus embodiment.

An embodiment of the machining apparatus 100 is generally shown in FIG. 1. The machining apparatus 100 includes a lathe 110, a mill 120, and a workpiece holder 140, each supported on a common frame 101. A controller 200 is in operable communication with the lathe 110, mill 120, and workpiece holder 140 for controlling the movement of the components.

The lathe 110 of the machining apparatus 100 includes a first lathe spindle 112 that is rotatable about axis A1 in either direction. The lathe 110 may, if desired, also include a second lathe spindle 114 that is rotatable about axis A2. The lathe 110 performs machining operations of a conventional lathe.

The mill 120 of the machining apparatus 100 includes a mill head 122 that is moveable vertically along a mill head support 124 member as indicated by arrow 126. The mill head 122 is also rotatable substantially 180 degrees about axis A3 as indicated by arrow 123. The mill head 122 includes a mill spindle 128 that turns about axis A4 in either direction. When in operation, a milling tool 131 is mounted on the mill spindle 128. When the mill spindle 128 turns, it turns the milling tool 131 for cutting a workpiece.

The workpiece holder 140 of the machining apparatus 100 includes a workpiece holder head 142 including mechanical components therein for rotating a workpiece turret 144 about axis A5. In the drawings, a plurality of workpieces 146 are mounted on the turret 144. The workpiece holder 140 is horizontally moveable along a workpiece holder support 148 in the forward and reverse directions as indicated by arrow 150 and vertically moveable as indicated by arrow 151.

Figure 2:
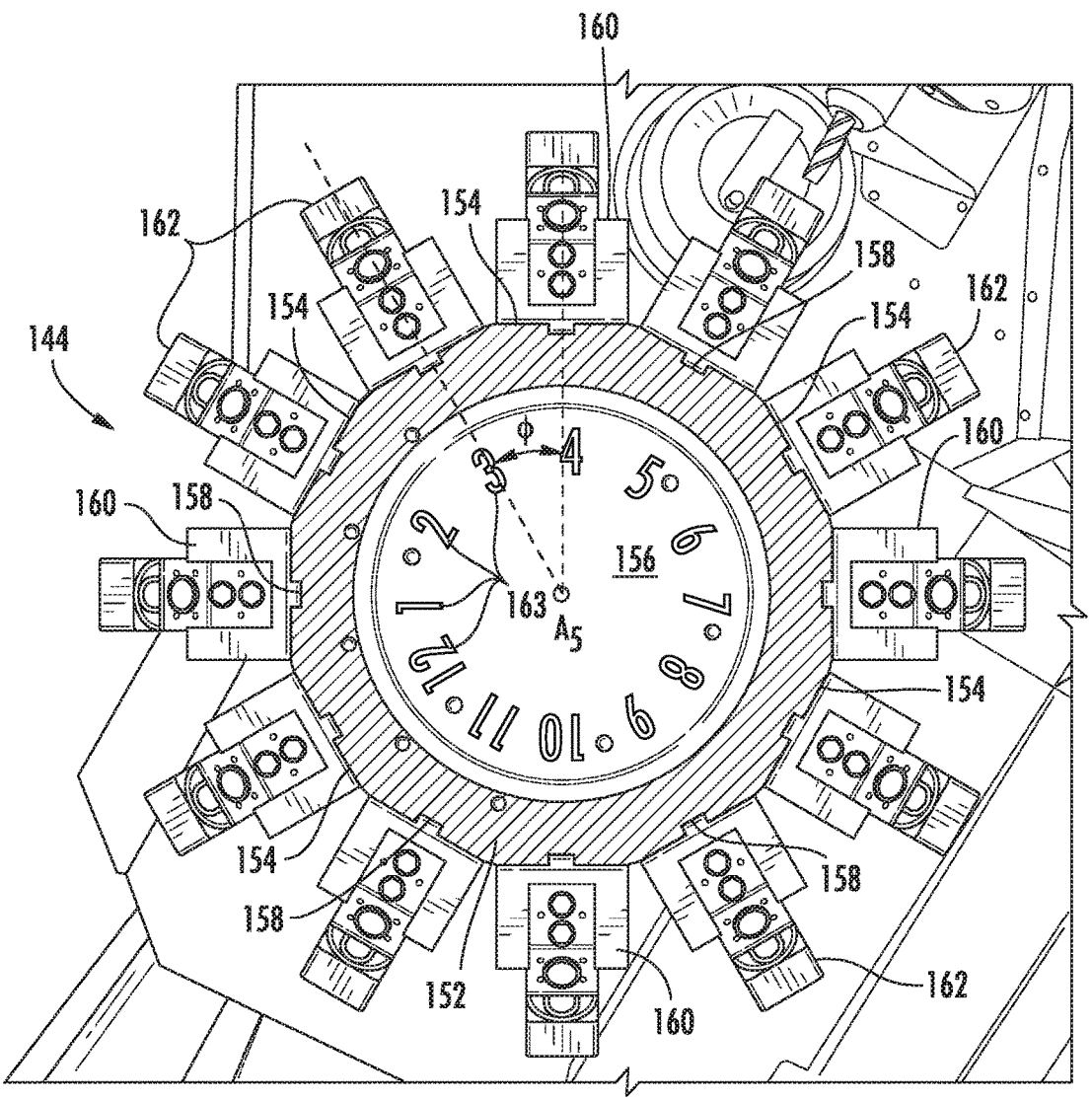
FIG. 2 is a front view of a work piece holder embodiment.

Additional details of the turret 144 are now described with reference to FIG. 2. The turret 144 includes a turret body 152 having a plurality of circumferentially arranged peripheral faces 154 arcuately spaced from one another by angle 9. A workpiece mounting position 155 where a workpiece may be mounted is at each peripheral face 154. The axis A5 in FIG. 2 is perpendicular to a forward face 156 of the turret 144. A mounting groove 158 formed in each peripheral face 154 accepts a workpiece clamp 160 therein, on which is securely mounted a workpiece 162. The workpiece 162 is the article to be machined.

In the embodiment shown, the turret 144 is equipped to hold twelve workpieces 162. This is shown by way of example only, as other turrets 144 may have more or fewer mounting positions for workpieces 162.

Figure 3:
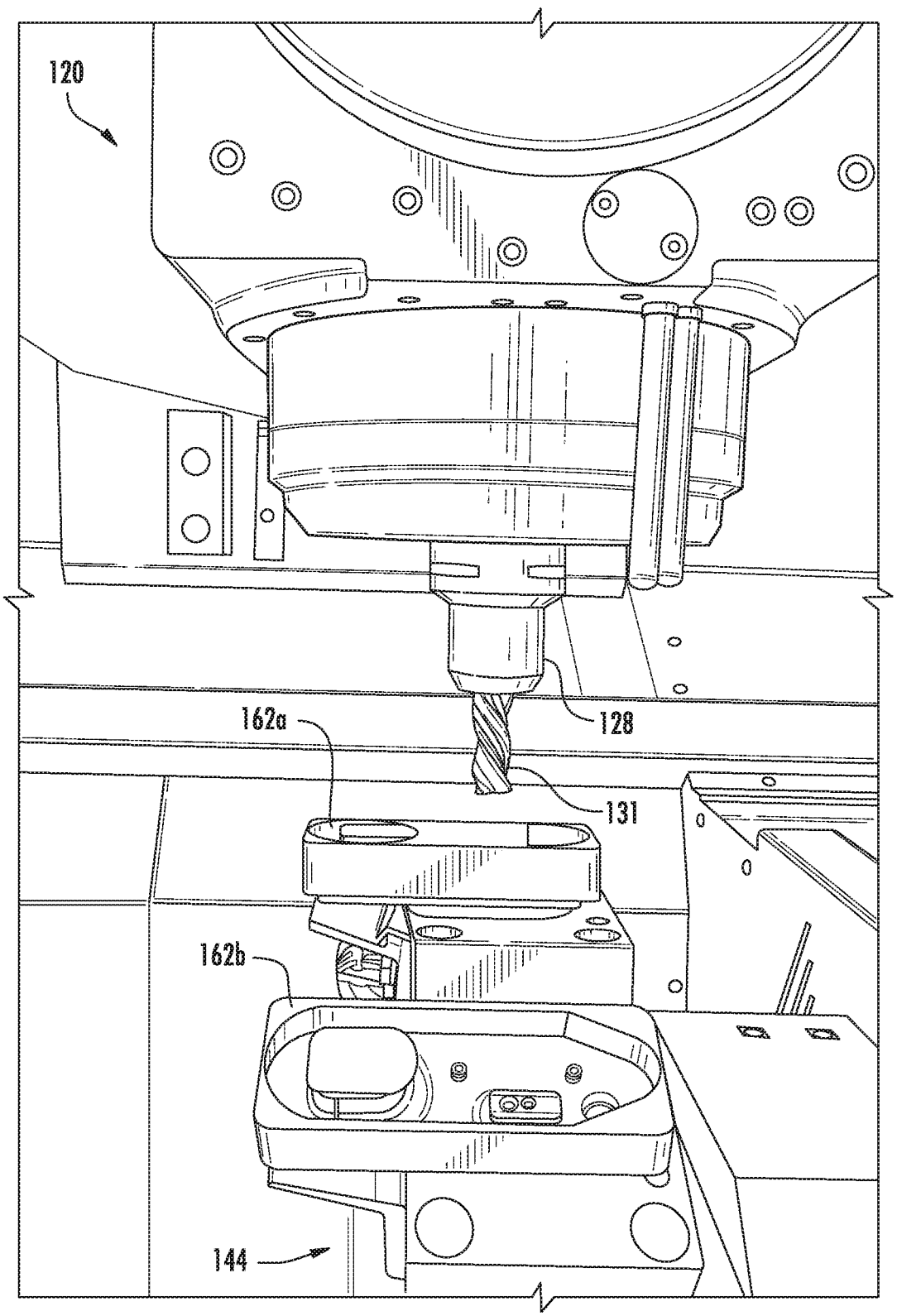
FIG. 3 is a side view of a workpiece in position for a milling operation.
Figure 4:
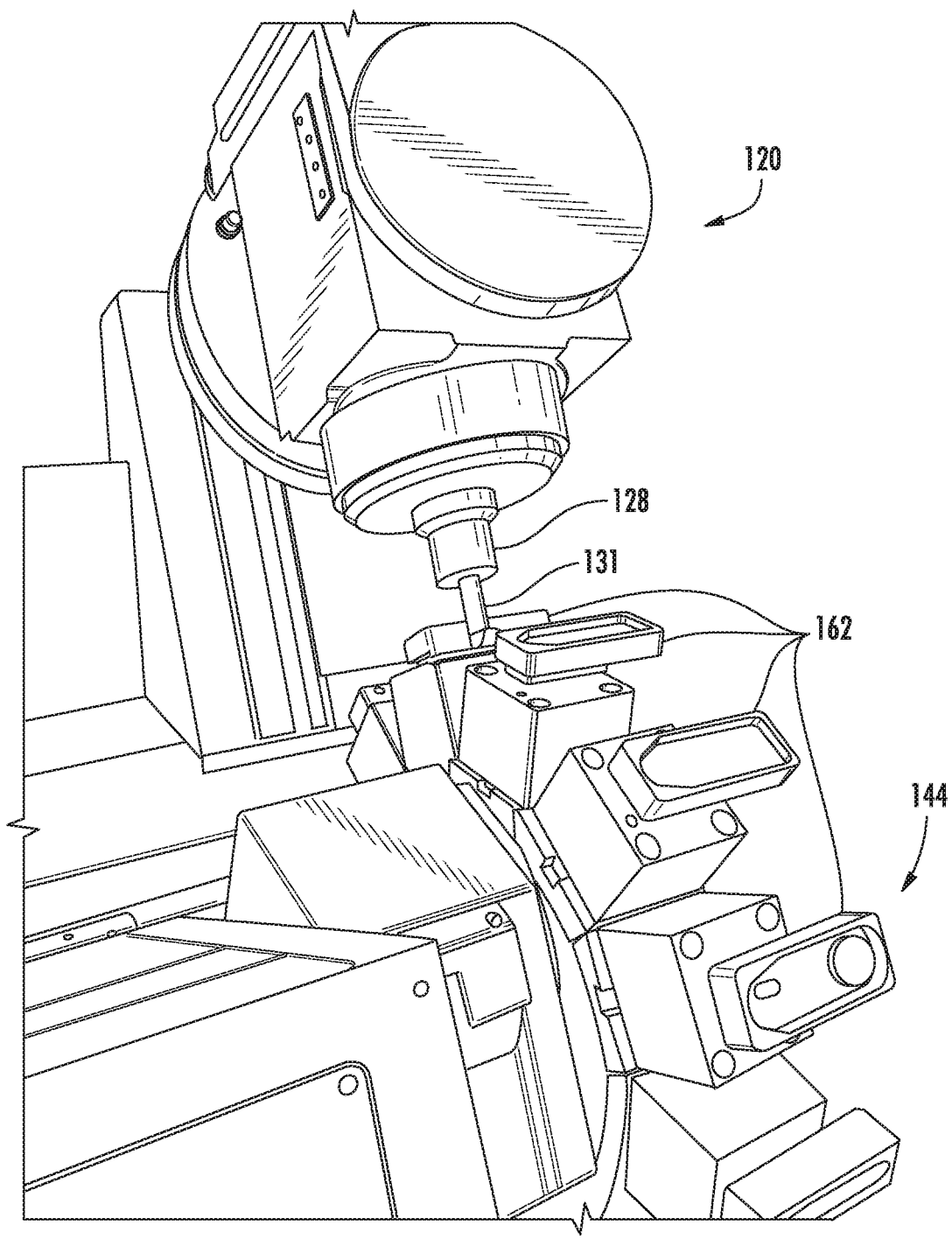
Figure 5:
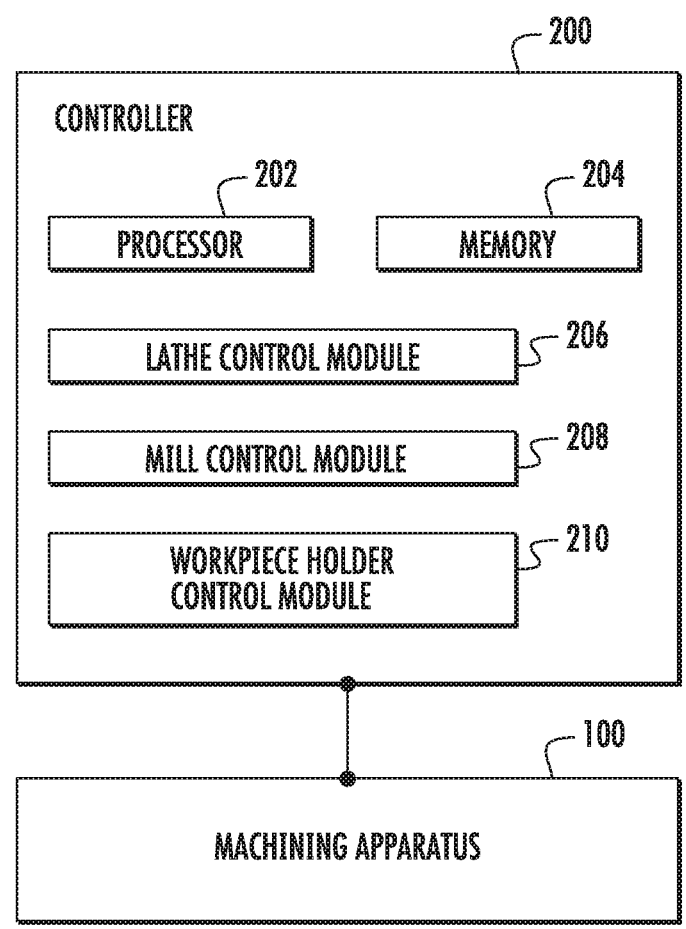
FIG. 5 is a block diagram of a controller embodiment.

FIGS. 3 and 4 shows an example of a machining operation being performed on a workpiece 162a mounted on the turret 144. The machining operation in this example is a milling operation. The workpiece 162a to be machined is moved into position by rotating the turret 144. Once the milling operation on workpiece 162a is completed, the turret is then rotated so that a subsequent milling operation may be performed on another workpiece 162b.

The controller 200 allows the machining operations to be automated. Additional details of the controller 200 are now discussed with reference to FIG. 4. The controller 200 includes a processor 202 adapted to execute machine readable program instructions stored on non-transitory machine readable memory 204.

When a user desires to machine a raw workpiece 162 into a machined part, the user may program the controller 200 by inputting machining instructions. The machining instructions may include information such as machining parameters, tolerances, computer assisted design drawing files, among other things. The machining instructions are similar to the type input into a convential CNC machining apparatus.

The controller 200 controls the movement of the lathe spindle(s) 112,114, the milling head 122, and the workpiece holder 140 according to the program instructions.

A lathe control module 206 controls lathe 110 parameters such as spindle speed, cutting tool to be used, cutting tool positions, cutting tool changes, and lathe operations to be performed.

A mill control module 208 controls the rotation of the mill head 122 about axis A3, the cutting tool to be used, cutting tool changes, mill spindle speed, speed of translating the cutting tool, depth of cuts, and mill operations to be performed.

A workpiece holder control module 210 controls the lateral position of the workpiece holder 140 and causes the turret 144 to rotate to place a workpiece 162 in the desired position for a machining to be performed on it. The controller 200 will sequentially move the workpieces 162 on the turret 144 into position so that machining operations may be performed on them. Once the machining operation on one workpiece 162 is completed, the controller 200 rotates the turret 144 to place a different workpiece 162 in position for a machining operation to be performed on it. The controller 200 may repeat this function over and over until the desired machining operations on each workpiece 162 are complete.

The controller 200 knows the location of each workpiece mounting position because each workpiece mounting position is assigned an identifier 163. In FIG. 2, for example, the workpiece mounting positions are identified with numbers 1 through 12. If workpieces 162 are only placed in a few of the mounting positions, the identifier 163 for each mounting position where a workpiece 162 is located is programmed into the controller 200 so that the controller 200 will only place workpiece mounting positions that have a workpiece 162 mounted thereon in position for machining operations.

This disclosure describes preferred embodiments, but not all possible embodiments. Where a particular feature is disclosed in the context of a particular embodiment, that feature can also be used, to the extent possible, in combination with and/or in the context of other embodiments. The possible embodiments should not be construed as limited to only the embodiments described here.

That which is claimed is:

1. A multi-axis automated machining apparatus comprising:
    a first lathe that performs lathe machining operations, the first lathe having a first lathe spindle that rotates about a first axis when performing lathe machining operations;
    a second lathe that performs lathe machining operations, the second lathe having a second lathe spindle that rotates about a second axis when performing lathe machining operations, the second axis being parallel or coaxial with the first axis;
    a mill having a mill spindle that rotates about a third axis that is substantially perpendicular to the first axis when performing mill machining operations;

a workpiece holder that holds a plurality of workpieces to be machined, the workpiece holder including a rotatable turret having a plurality of workpiece mounting positions thereon for mounting the plurality of workpieces to be machined to the rotatable turret, the rotatable turret being rotatable around a fourth axis that is substantially parallel to the first axis; and a controller in operable communication with the first lathe, second lathe, mill, and workpiece holder, the controller being operable to rotate the turret sequentially through different workpiece mounting positions according to program instructions defining machining operations to be performed on the plurality of workpieces.

2. The multi-axis automated machining apparatus of claim 1, wherein the rotatable turret is linearly translatable in a direction substantially parallel to the first axis.

3. The multi-axis automated machining apparatus of claim 1, wherein the plurality of workpieces are arcuately spaced apart along a circumference of the rotatable turret, the circumference circumscribing the fourth axis.

4. The multi-axis automated machining apparatus of claim 1, wherein the workpiece holder is linearly translatable in a direction substantially parallel to the first axis.

5. The multi-axis automated machining apparatus of claim 1, wherein the controller executes program instructions that:
  rotate the rotatable turret so as to position a first workpiece of the plurality of workpieces in a cutting position;
  perform a first machining operation on the first workpiece according to the program instructions;
  rotate the rotatable turret so as to position a second workpiece of the plurality of workpieces in the cutting position; and
  perform a second machining operation on the second workpiece of the plurality of workpieces according to the program instructions.

6. The multi-axis automated machining apparatus of claim 5, wherein the second machining operation is the same as the first machining operation.

7. An automated machining apparatus comprising:
  a lathe that performs lathe machining operations;
  a mill that performs mill machining operations;
  a workpiece holder that holds a plurality of workpieces to be machined, the workpiece holder including a rotatable turret having a plurality of workpiece mounting positions thereon for mounting the plurality of workpieces to be machined to the rotatable turret; and
  a controller in operable communication with the workpiece holder, the controller being operable to rotate the rotatable turret sequentially through different workpiece mounting positions according to program instructions defining machining operations to be performed on the plurality of workpieces.

8. The automated machining apparatus of claim 7, wherein:
  the lathe includes a lathe spindle that rotates around a first axis when performing lathe machining operations;
  the rotatable turret rotates around a second axis that is substantially parallel to the first axis; and
  the workpiece holder is linearly translatable in a direction substantially parallel to the first axis.

9. The automated machining apparatus of claim 7, wherein the plurality of workpiece mounting positions are arcuately spaced apart along a circumference of the rotatable turret, the circumference circumscribing a rotational axis of the rotatable turret.

10. The automated machining apparatus of claim 7, wherein the controller is operable to rotate the rotatable turret sequentially through different workpiece mounting positions in such a way that once the defined machining operations are complete on a first workpiece, the controller rotates the rotatable turret so as to position a second workpiece in position for the defined machining operations to be performed on the second workpiece.

11. The automated machining apparatus of claim 7, wherein:
  the lathe includes a lathe spindle that rotates around a first axis when performing lathe machining operations;
  the rotatable turret rotates around a second axis that is substantially parallel to the first axis;
  the workpiece holder is linearly translatable in a direction substantially parallel to the first axis;
  the plurality of workpiece mounting positions are arcuately spaced apart along a circumference of the rotatable turret, the circumference circumscribing the second axis; and
  the controller is operable to rotate the rotatable turret sequentially through different workpiece mounting positions in such a way that once the defined machining operations are complete on a first workpiece, the controller rotates the rotatable turret so as to position a second workpiece in position for the defined machining operations to be performed on the second workpiece.

12. The automated machining apparatus of claim 7, wherein the controller executes program instructions that:
  rotate the rotatable turret so as to position a first workpiece of the plurality of workpieces in a cutting position;
  perform a first machining operation on the first workpiece according to the program instructions;
  rotate the rotatable turret so as to position a second workpiece of the plurality of workpieces in the cutting position; and
  perform a second machining operation on the second workpiece of the plurality of workpieces according to the program instructions.

* * * * *